United States Patent [19]
Gale

[11] Patent Number: 5,894,872
[45] Date of Patent: Apr. 20, 1999

[54] MOTORCYCLE GASOLINE TANK FILLING VALVE

[76] Inventor: Michael J. Gale, 153 N. Delmorr Ave., Morrisville, Pa. 19067-6205

[21] Appl. No.: 08/996,777

[22] Filed: Dec. 23, 1997

Related U.S. Application Data

[63] Continuation-in-part of application No. 08/747,258, Nov. 18, 1996, abandoned.

[51] Int. Cl.$^6$ ...................................... B65B 3/00
[52] U.S. Cl. .................... 141/368; 141/338; 141/382; 141/392; 220/86.2
[58] Field of Search ................... 141/312, 337, 141/338, 368, 382, 392; 220/86.1, 86.2

[56] References Cited

U.S. PATENT DOCUMENTS

| | | |
|---|---|---|
| 1,461,654 | 7/1923 | Haessler .................................. 141/338 |
| 1,538,171 | 5/1925 | Dailey ..................................... 141/348 |
| 1,563,005 | 11/1925 | Allee ....................................... 141/338 |
| 4,234,098 | 11/1980 | Miller et al. ............................ 220/86.2 |
| 4,811,763 | 3/1989 | Kupske .................................... 141/392 |

FOREIGN PATENT DOCUMENTS 2306559  3/1925  United Kingdom ................... 141/338

*Primary Examiner*—J. Casimer Jacyna

[57] ABSTRACT

A motorcycle gasoline tank filling valve including an outer member secured to an outer surface of a filling opening of a motorcycle gasoline tank. A cylindrical filling tube is slidably disposed within the outer member for communication with the motorcycle gasoline tank. A retention mechanism is secured to a lower surface of the outer member and secured to the cylindrical filling tube for biasing of the cylindrical filling tube to an orientation extended outwardly of the filling opening.

5 Claims, 5 Drawing Sheets

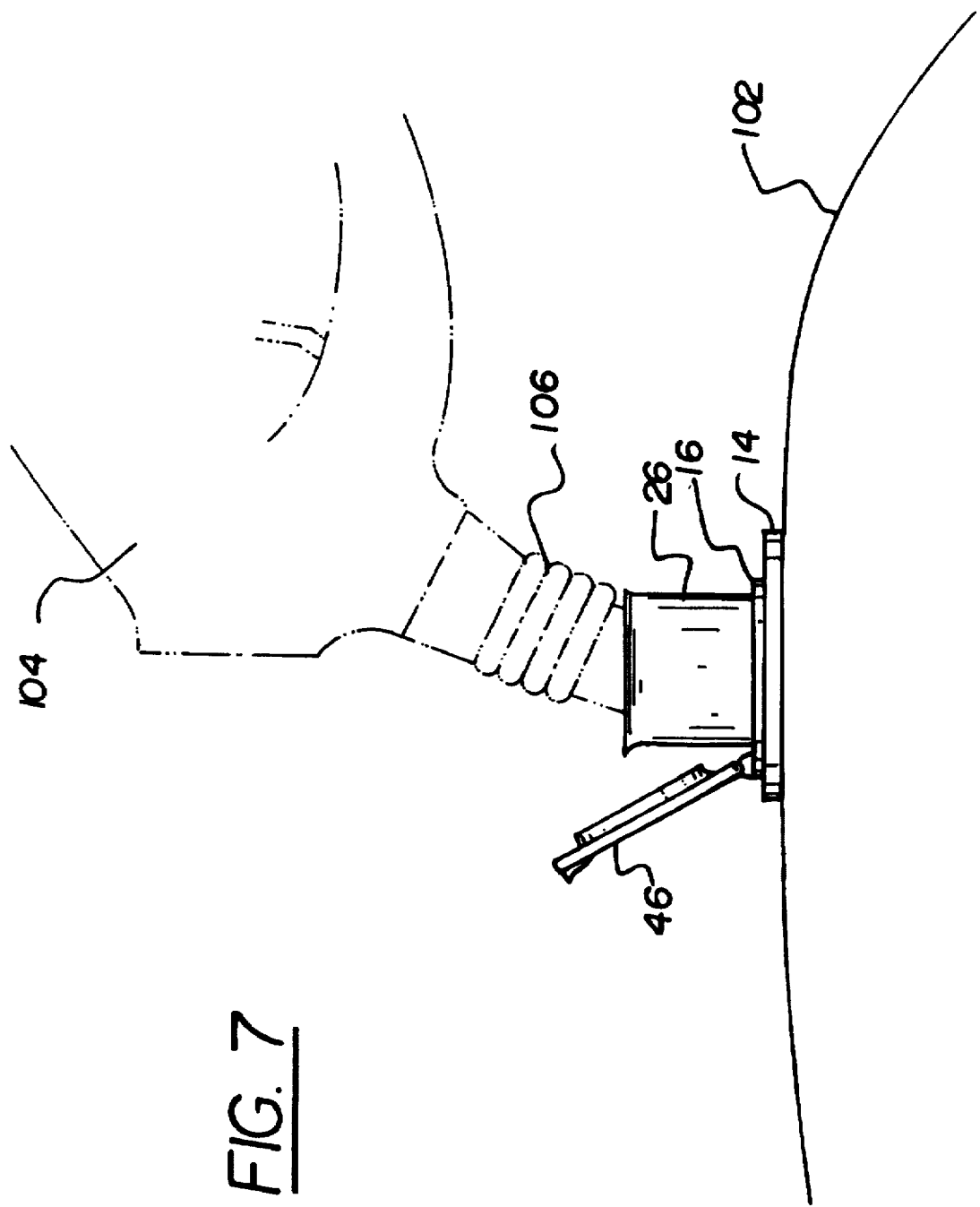

FIG. 8
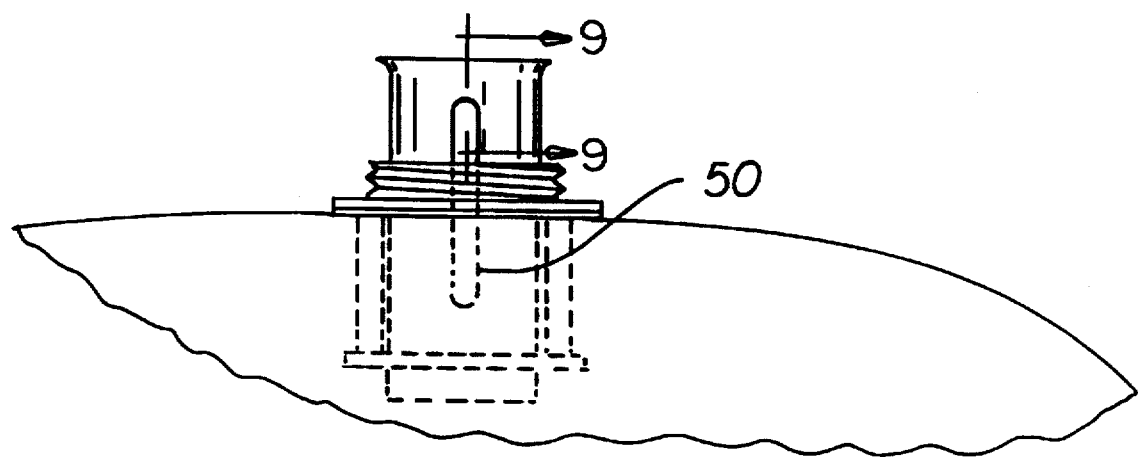
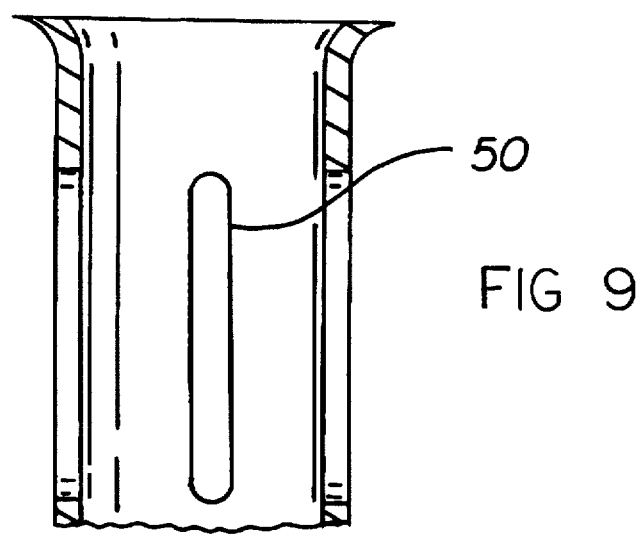
FIG 9

MOTORCYCLE GASOLINE TANK FILLING VALVE

Related Application

The present application is a continuation-in-part of an application filed Nov. 18, 1996 under Ser. No. 08/747,258, now abandoned.

BACKGROUND OF THE INVENTION

1. Field of the Invention

The present invention relates to a motorcycle gasoline tank filling valve and more particularly pertains to enabling a user to dispense gasoline into the tank without having to pull back manually on a nozzle jacket with a motorcycle gasoline tank filling valve.

2. Description of the Prior Art

The use of fuel tanks for motorcycles is known in the prior art. More specifically, fuel tanks for motorcycles heretofore devised and utilized for the purpose of allowing fuel to be added to the tank are known to consist basically of familiar, expected and obvious structural configurations, notwithstanding the myriad of designs encompassed by the crowded prior art which have been developed for the fulfillment of countless objectives and requirements.

By way of example, U.S. Pat. No. 4,811,763 to Kupske discloses an arrangement for filling fuel tanks in motorcycles formed of a cylinder secured to the tank walls for creating a ventilation system.

U.S. Pat. No. 4,171,750 Hundemer discloses a fuel tank for motor vehicles whose fuel filler opening is located in the tank wall with a short pipe-like member adapted to be mounted over the opening.

U.S. Pat. No. 5,123,557 to Drawbaugh discloses a gas stopper and methods of constructing and utilizing the same, and is illustrative of the degree of disclosure required for inventions in the area of classification of the present invention.

U.S. Pat. Nos. 5,285,830 to Hilpipre, Jr., 4,901,776 to Attinello and 4,234,098 to Miller et al. all disclose relative devices in the area of classification of the present invention.

While these devices fulfill their respective, particular objective and requirements, the aforementioned patents do not describe a motorcycle gasoline tank filling valve for enabling a user to dispense gasoline into the tank without having to pull back manually on a nozzle jacket.

In this respect, the motorcycle gasoline tank filling valve according to the present invention substantially departs from the conventional concepts and designs of the prior art, and in doing so provides an apparatus primarily developed for the purpose of enabling a user to dispense gasoline into the tank without having to pull back manually on a nozzle jacket.

Therefore, it can be appreciated that there exists a continuing need for new and improved motorcycle gasoline tank filling valve which can be used for enabling a user to dispense gasoline into the tank without having to pull back manually on a nozzle jacket. In this regard, the present invention substantially fulfills this need.

SUMMARY OF THE INVENTION

In the view of the foregoing disadvantages inherent in the known types of fuel tanks for motorcycles now present in the prior art, the present invention provides an improved motorcycle gasoline tank filling valve. As such, the general purpose of the present invention, which will be described subsequently in greater detail, is to provide a new and improved motorcycle gasoline tank filling valve and method which has all the advantages of the prior art and none of the disadvantages.

To attain this, the present invention essentially comprises an outer member comprised of an annular ring secured to an outer surface of a filling opening of a motorcycle gasoline tank. The outer member has a cylindrical sleeve extending upwardly from the annular ring. The cylindrical sleeve has an inwardly extending abutting portion within an interior thereof. The cylindrical sleeve has external threads disposed thereon. The annular ring has a plurality of apertures therethrough. The device includes a cylindrical filling tube having a flared open upper end and an open lower end. The cylindrical filling tube is slidably disposed within the outer member whereby the flared open end contacts the abutting portion of the cylindrical sleeve to prevent inward separation of the cylindrical filling tube from the outer member. The cylindrical filling tube has an annular flange extending outwardly therefrom upwardly of the open lower end thereof. The device includes a retention mechanism comprised of a plurality of sleeves each having upper ends secured to a lower surface of the annular ring of the outer member. Each of the sleeves have a spring disposed therewithin and secured to the upper ends thereof. The retention mechanism including a plurality of posts slidably received within the plurality of sleeves. Upper ends of the posts are secured to free ends of the spring of each sleeve. Free ends of the plurality of posts are secured to the annular flange of the cylindrical filling tube. A cap is dimensioned for coupling with the cylindrical sleeve of the outer member.

There has been thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

It is therefore an object of the present invention to provide a new and improved motorcycle gasoline tank filling valve which has all the advantages of the prior art fuel tanks for motorcycles and none of the disadvantages.

It is another object of the present invention to provide a new and improved motorcycle gasoline tank filling valve which may be easily and efficiently manufactured and marketed.

It is a further object of the present invention to provide a new and improved motorcycle gasoline tank filling valve which is of durable and reliable construction.

An even further object of the present invention is to provide a new and improved motorcycle gasoline tank filling valve which is susceptible of a low cost of manufacture with regard to both materials and labor, and which accordingly is then susceptible of low prices of sale to the consuming public, thereby making such a motorcycle gasoline tank filling valve economically available to the buying public.

Even still another object of the present invention is to provide a new and improved motorcycle gasoline tank filling valve for enabling a user to dispense gasoline into the tank without having to pull back manually on a nozzle jacket.

Lastly, it is an object of the present invention to provide a new and improved motorcycle gasoline tank filling valve including an outer member secured to an outer surface of a filling opening of a motorcycle gasoline tank. A cylindrical filling tube is slidably disposed within the outer member. A retention mechanism is secured to a lower surface of the outer member and secured to the cylindrical filling tube.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 7 is a side view of a second embodiment of the present invention.

FIG. 8 is a side view of the breathing slots of the cylindrical filling tube of the present invention.

FIG. 9 is a cross-sectional view of the cylindrical filling tube of FIG. 8.

The same reference numerals refer to the same parts through the various Figures.

DESCRIPTION OF THE PREFERRED EMBODIMENT

Figure 1:
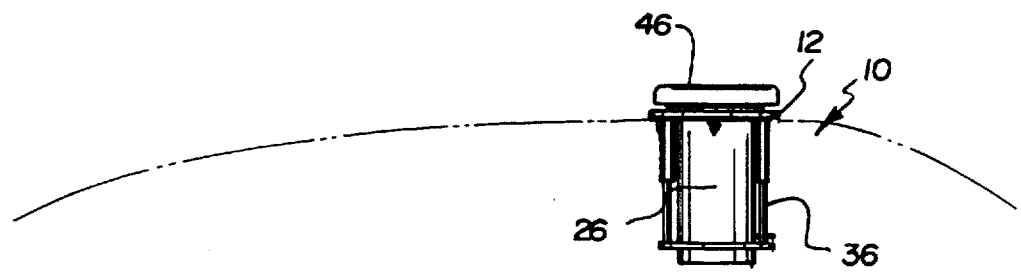
FIG. 1 is a perspective view of the preferred embodiment of the motorcycle gasoline tank filling valve constructed in accordance with the principles of the present invention.
Figure 2:
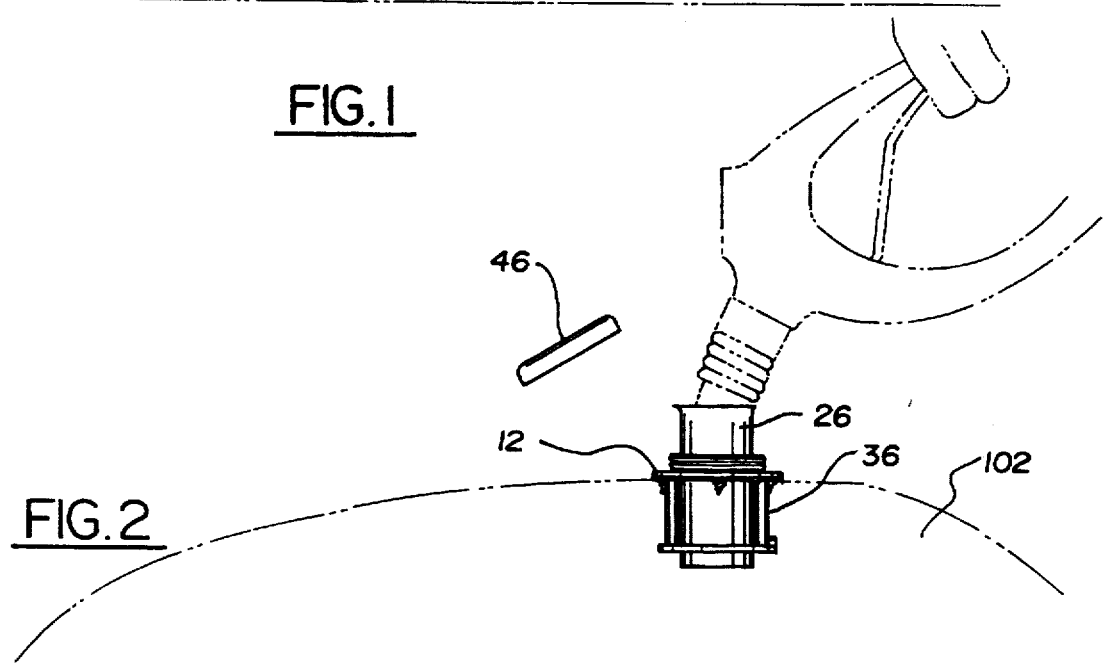
FIG. 2 is a side view of the present invention illustrated in use.
Figure 4:
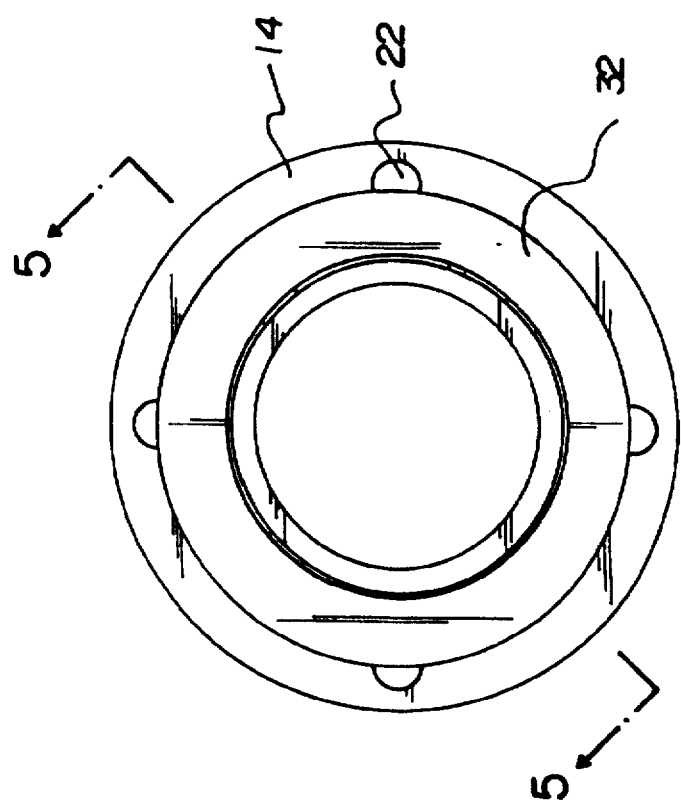
FIG. 4 is a bottom view of the present invention as taken along line 4—4 of FIG. 3.
Figure 3:
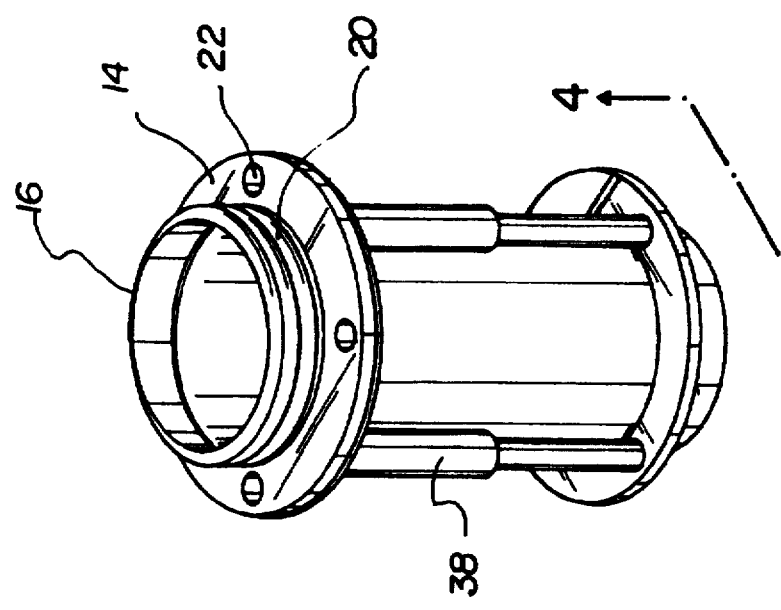
FIG. 3 is an isolation view of the present invention.
Figure 6:
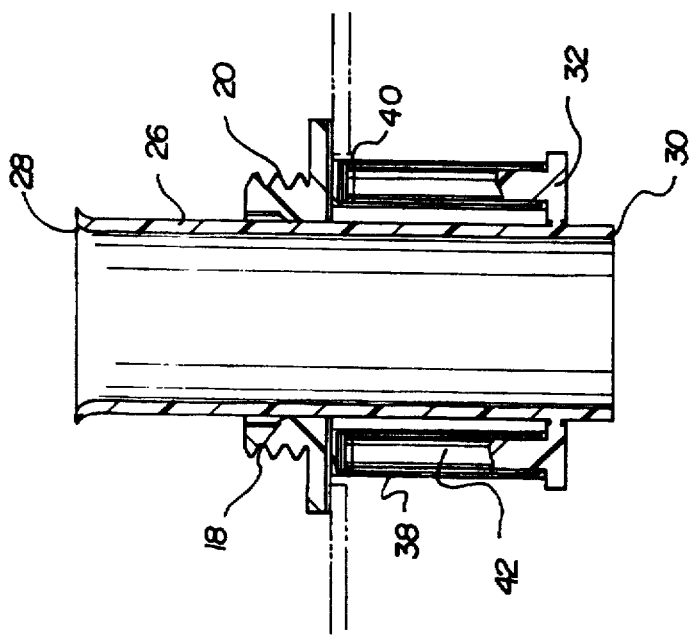
FIG. 6 is a cross-sectional view of the present invention in an extended orientation.
Figure 5:
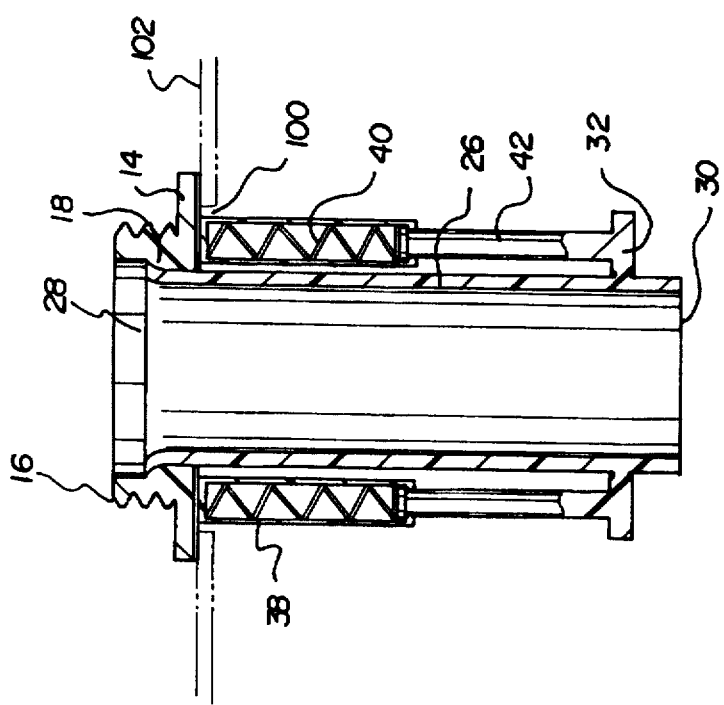
FIG. 5 is a cross-sectional view as taken along line 5—5 of FIG. 4.

With reference now to the drawings, and in particular, to FIGS. 1-9 thereof, the preferred embodiment of the new and improved motorcycle gasoline tank filling valve embodying the principles and concepts of the present invention and generally designated by the reference number 10 will be described.

Specifically, it will be noted in the various Figures that the device relates to a motorcycle gasoline tank filling valve for enabling a user to dispense gasoline into the tank without having to pull back manually on a nozzle jacket. In its broadest context, the device consists of an outer member, a cylindrical filling tube, a retention mechanism and a cap. Such components are individually configured and correlated with respect to each other so as to attain the desired objective.

The device 10 includes an outer member 12 comprised of an annular ring 14 secured to an outer surface of a filling opening 100 of a motorcycle gasoline tank 102. The outer member 12 has a cylindrical sleeve 16 extending upwardly from the annular ring 14. The cylindrical sleeve 16 has an inwardly extending abutting portion 18 within an interior thereof. The cylindrical sleeve 16 has external threads 20 disposed thereon. The annular ring 14 has a plurality of apertures 22 therethrough. The annular ring 14 serves to prevent the gasoline from splashing outside of the gas tank.

Next, the device 10 includes a cylindrical filling tube 26 having a flared open upper end 28 and an open lower end 30. The cylindrical filling tube 26 is slidably disposed within the outer member 12 whereby the flared open end 28 contacts the abutting portion 18 of the cylindrical sleeve 16 to prevent inward separation of the cylindrical filling tube 26 from the outer member 12. The cylindrical filling tube 26 has an annular flange 32 extending outwardly therefrom upwardly of the open lower end 30 thereof.

The device 10 includes a retention mechanism 36 comprised of a plurality of sleeves 38 each having upper ends secured to a lower surface of the annular ring 14 of the outer member 12. Each of the sleeves 38 have a spring 40 disposed therewithin and secured to the upper ends thereof. The retention mechanism 36 including a plurality of posts 42 slidably received within the plurality of sleeves 38. Upper ends of the posts 42 are secured to free ends of the spring 40 of each sleeve 38. Free ends of the plurality of posts 42 are secured to the annular flange 32 of the cylindrical filling tube 26. The springs 40 serve to bias the plurality of posts 42 upwardly within the sleeves 38 thereby pulling upwardly of the annular flange 32. This will cause the cylindrical filling tube 26 to extend outwardly of the filling opening 100. A gasoline nozzle 104 can then be inserted into the cylindrical filling tube 26 with a nozzle sleeve 106 being pushed back by the cylindrical filling tube 26 to allow for the tank 100 to be filled with gasoline. At this point, the gasoline nozzle 104 will be positioned within the gasoline tank 102 at the correct shut off level for a full tank.

A cap 46 is dimensioned for coupling with the cylindrical sleeve 16 of the outer member 12. The cap 46 will keep the cylindrical filling tube 26 retained within the gasoline tank 102. Removal of the cap 46 will allow for the cylindrical filling tube 26 to be biased outwardly of the filling opening 100.

A second embodiment of the present invention is shown in FIG. 7 and includes substantially all of the components of the present invention further including the cap 46 is hingedly secured to the annular ring 14 of the outer member 12.

The present invention can be used as a replacement part on existing motorcycles and also incorporated into new tank designs by the manufacturers of motorcycles and other gas operated equipment such as waverunners, snowmobiles, boats, fourwheelers and lawnmowers.

As shown in FIGS. 8 & 9, the cylindrical filling tube is equipped with at least one breathing slot 50, or venting hole, formed in the cylindrical filling tube. Ideally, multiple breathing slots are employed. With such breathing slots, fuel within the tank is capable of rising above a bottom of the cylindrical filling tube. In various alternate embodiments, different configurations of slots or apertures may be utilized to accomplish the foregoing purpose.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and the manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modification and changes will readily occur to those skilled in the art, it is not desired to limit the invention to the exact construction and operation shown and described, and accordingly, all suitable modification and equivalents may be resorted to, falling within the scope of the invention.

What is claimed as being new and desired to be protected by LETTERS PATENT of the United States is as follows:

1. A motorcycle gasoline tank filling valve for enabling a user to dispense gasoline into the tank without having to pull back manually on a nozzle jacket comprising, in combination:

an outer member comprised of an annular ring adapted for securement to an outer surface of a filling opening of a motorcycle gasoline tank, the outer member having a cylindrical sleeve extending upwardly from the annular ring, the cylindrical sleeve having an inwardly extending abutting portion within an interior thereof, the cylindrical sleeve having external threads disposed thereon, the annular ring having a plurality of apertures therethrough;

a cylindrical filling tube having a flared open upper end and an open lower end, the cylindrical filling tube slidably disposed within the outer member whereby the flared open end contacting the abutting portion of the cylindrical sleeve to prevent inward separation of the cylindrical filling tube from the outer member, the cylindrical filling tube having an annular flange extending outwardly therefrom upwardly of the open lower end thereof;

a retention mechanism comprised of a plurality of sleeves each having upper ends secured to a lower surface of the annular ring of the outer member, each of the sleeves having a spring disposed therewithin and secured to the upper ends thereof, the retention mechanism including a plurality of posts slidably received within the plurality of sleeves, upper ends of the posts secured to free ends of the spring of each sleeve, free ends of the plurality of posts secured to the annular flange of the cylindrical filling tube;

a cap dimensioned for coupling with the cylindrical sleeve of the outer member.

2. A motorcycle gasoline tank filling valve comprising:

an outer member adapted for securement to an outer surface of a filling opening of a motorcycle gasoline tank, the outer member comprised of an annular ring secured to the outer surface of the filling opening of the motorcycle gasoline tank, the outer member having a cylindrical sleeve extending upwardly from the annular ring, the cylindrical sleeve having an inwardly extending abutting portion within an interior thereof;

a cylindrical filling tube slidably disposed within the outer member, the cylindrical filling tube having a flared open upper end and an open lower end, the cylindrical filling tube slidably disposed within the outer member whereby the flared open end contacting the abutting portion of the cylindrical sleeve to prevent inward separation of the cylindrical filling tube from the outer member, the cylindrical filling tube having an annular flange extending outwardly therefrom upwardly of the open lower end thereof;

a retention mechanism secured to a lower surface of the outer member and secured to the cylindrical filling tube, the retention mechanism comprised of a plurality of sleeves each having upper ends secured to a lower surface of the annular ring of the outer member, each of the sleeves having a spring disposed therewithin and secured to the upper ends thereof, the retention mechanism including a plurality of posts slidably received within the plurality of sleeves, upper ends of the posts secured to free ends of the spring of each sleeve, free ends of the plurality of posts secured to the annular flange of the cylindrical filling tube.

3. The filler valve as set forth in claim 2 and further including a cap dimensioned for coupling with the cylindrical sleeve of the outer member.

4. The filler valve as set forth in claim 3 wherein the cap is hingedly secured to the annular ring of the outer member.

5. The filler valve as set forth in claim 2 wherein the cylindrical filling tube has a breathing slot formed therein.

* * * * *